(12) United States Patent
Koh (10) Patent No.: US 8,427,767 B2
(45) Date of Patent: Apr. 23, 2013

(54) AUTO FOCUSING LENS MODULE AND CALIBRATING METHOD THEREOF

(75) Inventor: Hong Bin Koh, New Taipei (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 13/214,253

(22) Filed: Aug. 22, 2011

(65) Prior Publication Data
US 2012/0224275 A1 Sep. 6, 2012

(30) Foreign Application Priority Data

Mar. 1, 2011 (TW) .............................. 100106677 A (51) Int. Cl.
*G02B 7/02* (2006.01)
*G02B 15/14* (2006.01)

(52) U.S. Cl.
USPC ............................ 359/823; 359/822; 359/694

(58) Field of Classification Search .......... 359/694–704, 359/811–830; 396/106, 79; 250/221
See application file for complete search history.

(56) References Cited

U.S. PATENT DOCUMENTS

| 6,807,022 | B1 * | 10/2004 | Yanowitz | 359/822 |
| 2007/0057166 | A1 * | 3/2007 | Kuo et al. | 250/221 |
| 2011/0243541 | A1 * | 10/2011 | Wang et al. | 396/106 |

* cited by examiner

*Primary Examiner* — Mohammed Hasan
(74) *Attorney, Agent, or Firm* — Jianq Chyun IP Office (57) ABSTRACT

An auto focusing lens module is provided, which includes a casing, a photo interrupter and a lens holder. The casing has a containing space. The photo interrupter is fixedly disposed on the casing and has a light-emitting surface and a light-sensing surface opposite to the light-emitting surface. The lens holder is disposed in the containing space and has a first obstacle and a second obstacle. The space between the first obstacle and the second obstacle keeps a calibrating interval. The lens holder is capable of moving to-and-fro along an axial direction to bring the first obstacle, the calibrating interval or the second obstacle to the space between the light-emitting surface and the light-sensing surface. The invention also provides a calibrating method suitable for the above-mentioned auto focusing lens module.

14 Claims, 7 Drawing Sheets

AUTO FOCUSING LENS MODULE AND CALIBRATING METHOD THEREOF

CROSS-REFERENCE TO RELATED APPLICATION

This application claims the priority benefit of Taiwan application serial no. 100106677, filed on Mar. 1, 2011. The entirety of the above-mentioned patent application is hereby incorporated by reference herein and made a part of this specification.

BACKGROUND OF THE INVENTION

1. Field of the Invention

The invention generally relates to a lens module and a calibrating method thereof, and more particularly, to an auto focusing lens module and a calibrating method thereof.

2. Description of Related Art

In traditional auto focusing lens set driving manner for mini camera, if the coil of a voice coil motor is a moving part, the voice coil motor positioning device can include a device mantle, a moving base of installing lens set, a voice coil motor, a position feedback sensor and a positioning controller. The voice coil motor includes a moving coil fixed at a surface of the moving base of installing lens set and electrically connected to a plate-like whirl power cable formed by a flexible circuit board at another surface of the moving base of installing lens set. In addition, the voice coil motor also includes a magnetic path subassembly consisting of magnet and yoke which is fixed at an inner ring portion of the device mantle and makes the moving coil right placed in a magnetic path gap formed by the magnetic path subassembly. The position feedback sensor includes a photo interrupter fixed at a printed circuit board (PCB) and embedded at the bottom of the device mantle. A light source reflective plate is fixed at a surface of the moving base of installing lens set facing the photo interrupter. A bias circuit is disposed in a circuit module outside the device mantle. The positioning controller may be formed with discrete components or integrated circuit (IC), which is contained in the circuit module as well.

If the coil of a voice coil motor is a fixing part, the voice coil motor positioning device can include a device mantle, a moving base of installing lens set, a voice coil motor, a position feedback sensor and a positioning controller. In more details, the voice coil motor includes a fixing coil fixed at an inner ring portion of the device mantle and electrically connected to a fixed power cable. In addition, the voice coil motor can also include a magnetic path subassembly consisting of magnet and yoke which is fixed at a surface of the moving base of installing lens set and makes the fixing coil right placed in a magnetic path gap formed by the magnetic path subassembly. The position feedback sensor includes a photo interrupter fixed at a PCB and embedded at the bottom of the device mantle. A light source reflective plate is fixed on a surface of the moving base of installing lens set facing the photo interrupter. A bias circuit is disposed in a circuit module outside the device mantle. The positioning controller may be formed with discrete components or integrated circuit (IC), and is contained in the circuit module as well.

SUMMARY OF THE INVENTION

Accordingly, the invention is directed to an auto focusing lens module with better focusing capability.

The invention is also directed to a calibrating method suitable for the above-mentioned lens module.

Other objectives and advantages of the invention should be further indicated by the disclosures of the invention.

To achieve one of, a part of or all of the above-mentioned advantages, or to achieve other advantages, an embodiment of the invention provides an auto focusing lens module, which includes a casing, a photo interrupter and a lens holder. The casing has a containing space. The photo interrupter is fixedly disposed on the casing and has a light-emitting surface and a light-sensing surface opposite to the light-emitting surface. The lens holder is disposed in the containing space and has a first obstacle and a second obstacle. The space between the first obstacle and the second obstacle keeps a calibrating interval. The lens holder is capable of moving to-and-fro along an axial direction to bring the first obstacle, the calibrating interval or the second obstacle to the space between the light-emitting surface and the light-sensing surface.

An embodiment of the invention also provides a calibrating method suitable for the above-mentioned auto focusing lens module. The calibrating method includes at least following steps: first, moving the lens holder, in which when the first obstacle is moved to the space between the light-emitting surface and the light-sensing surface, a home position is defined; next, keeping moving the lens holder so that the calibrating interval and the second obstacle sequentially pass through the space between the light-emitting surface and the light-sensing surface, in which when the second obstacle is moved to the space between the light-emitting surface and the light-sensing surface, the calibrating interval has been counted so as to obtain a counting value; then, comparing the counting value with a predetermined value so as to calibrate and set a moving scale for moving the lens holder.

An embodiment of the invention further provides an auto focusing lens module, which includes a casing, a photo interrupter and a lens holder. The casing has a containing space. The photo interrupter is fixedly disposed on the casing and has a light-emitting surface and a light-sensing surface opposite to the light-emitting surface. The lens holder is disposed in the containing space and the photo interrupter is located on the substantially middle position of a moving range of the lens holder in the containing space. The lens holder has a calibrating obstacle, and a calibrating width of the calibrating obstacle is substantially greater than or equal to 2 mm. The lens holder is capable of moving to-and-fro along an axial direction to bring the calibrating obstacle to-and-fro passing through the space between the light-emitting surface and the light-sensing surface.

Based on the description above, by means of counting the counting value of the calibrating interval and dividing the real physical amount of a given calibrating interval by the counted counting value so as to correct the present moving physical amount of the lens holder corresponding to per unit value. Accordingly, the invention can make the auto focusing lens module under long term operation or gradually miniaturizing the whole dimension thereof still have better image focusing capability. In addition, the invention also provides a calibrating method suitable for the above-mentioned lens module so as to advance the focusing capability of the lens module.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
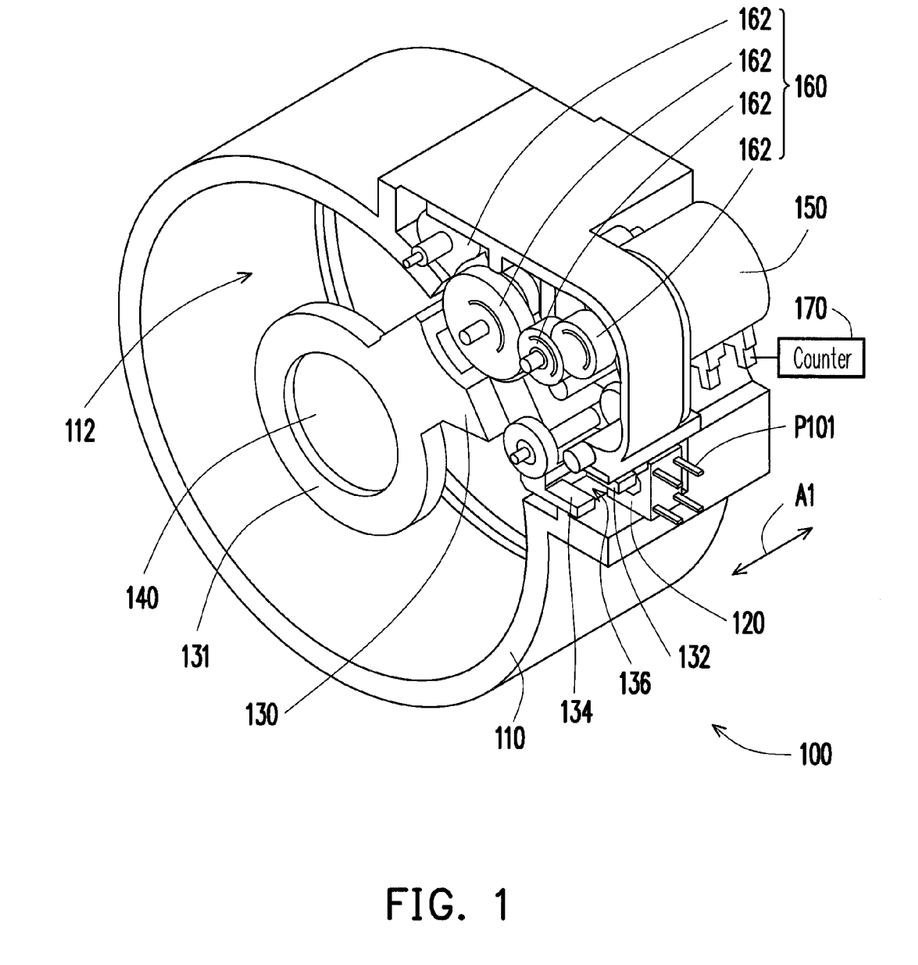
FIG. 1 is a localized diagram of an auto focusing lens module according to an embodiment of the invention.
Figure 2:
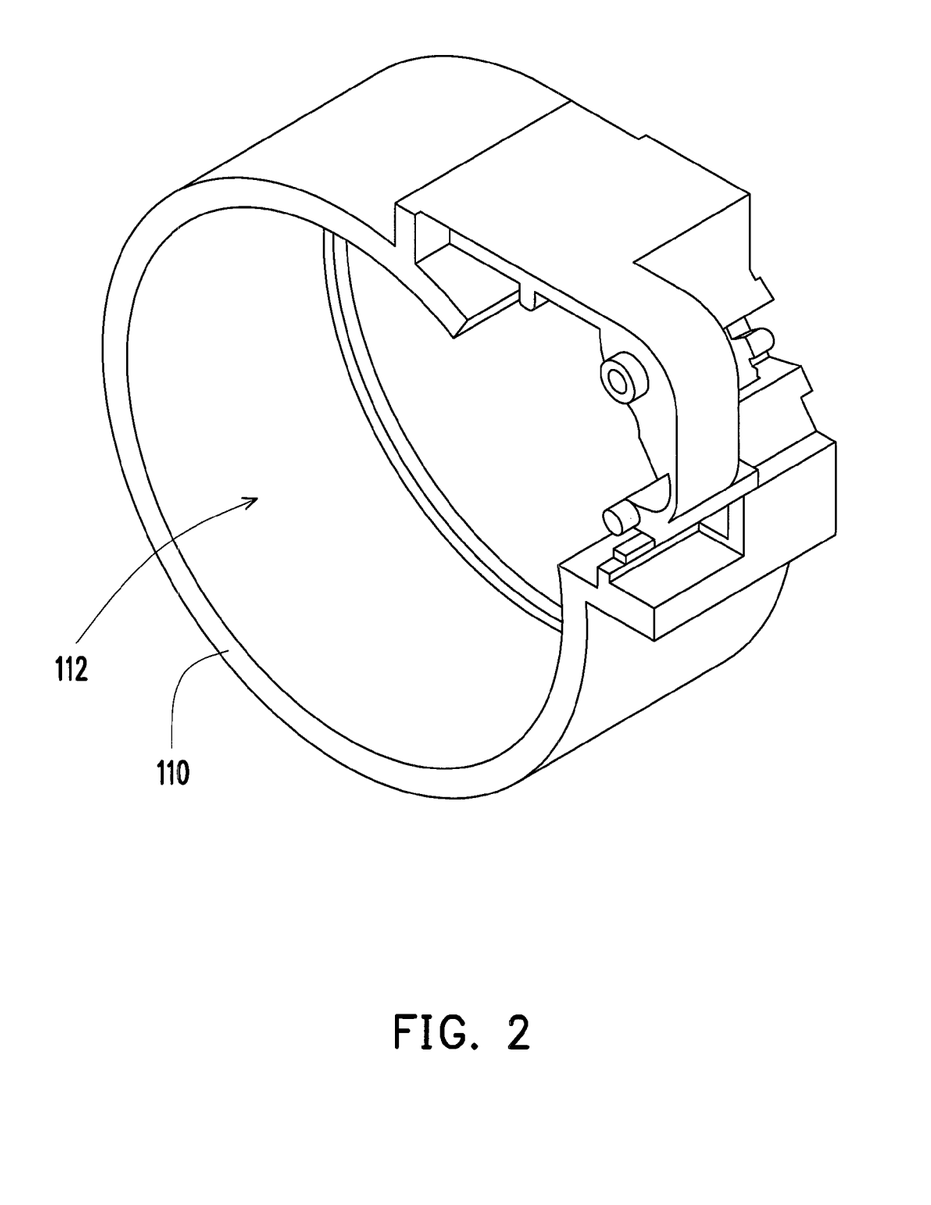
FIG. 2 is a diagram of the casing in FIG. 1.
Figure 3:
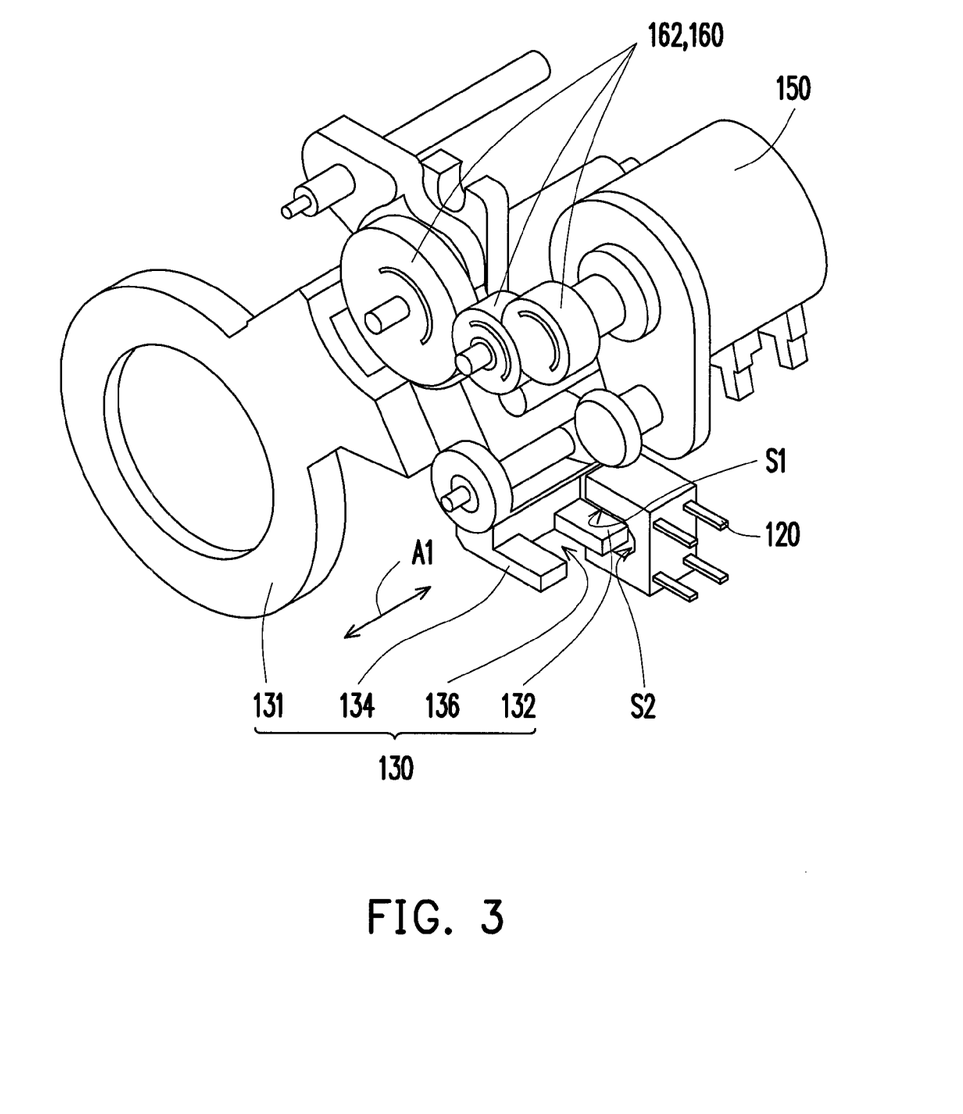
FIG. 3 is a diagram showing the photo interrupter, the lens holder and the transmission device in FIG. 1.

FIG. 1 is a localized diagram of an auto focusing lens module according to an embodiment of the invention, FIG. 2 is a diagram of the casing in FIG. 1 and FIG. 3 is a diagram showing the photo interrupter, the lens holder and the transmission device in FIG. 1. Referring to FIGS. 1, 2 and 3, an auto focusing lens module 100 of the embodiment includes a casing 110, a photo interrupter 120 and a lens holder 130. The casing 110 has a containing space 112. In the embodiment, the casing 110 is used mainly for installing the lens set, the photo interrupter 120, the lens holder 130 and a later mentioned transmission device 150 in the lens module 100, in which the lens set, the photo interrupter 120, the lens holder 130 and at least a portion of the transmission device 150 are located in the containing space 112 of the casing 110.

The photo interrupter 120 is fixedly disposed on the casing 110 and has a light-emitting surface S1 and a light-sensing surface S2 opposite to the light-emitting surface S1. In the embodiment, the photo interrupter 120 consists of a light emitter (not shown) and a light receiver (not shown), in which the light emitter may be implemented by an infra-red light emitting diode with wavelength over 800 nm, while the light receiver may be implemented by a phototransistor. The light-emitting surface S1 of the light emitter and the light-sensing surface S2 of the light receiver are usually face-to-face installed together. To specific, there is a gap between the light-emitting surface S1 of the light emitter and the light-sensing surface S2 of the light receiver, so that when there is no interrupter between the light-emitting surface S1 and the light-sensing surface S2 (i.e., there is no obstacle between the light-emitting surface S1 and the light-sensing surface S2), the light emitted from the infra-red light emitting diode will be directly transmitted to the phototransistor so that the phototransistor can sense the light signal to output an electric signal; on the contrary, when the space between the light-emitting surface S1 and the light-sensing surface S2 has an obstacle, the light intensity received by the phototransistor would be changed and, accordingly, another electric signal is output.

Continuing to FIGS. 1, 2 and 3, the lens holder 130 is disposed in the containing space 112 and has a first obstacle 132 and a second obstacle 134, in which the space between the first obstacle 132 and the second obstacle 134 keeps a calibrating interval 136. In the auto focusing lens module 100, in order to perform auto focusing on an object (not shown) of an object side, the lens holder 130 is capable of moving to-and-fro along an axial direction A1 so that at least a lens 140 located thereon may be effectively imaged at an image side (not shown), in which at least a lens 140 is disposed on a lens base 131 of the lens holder 130, as shown by FIG. 1. The mechanism for the auto focusing lens module 100 of the embodiment to perform auto focusing and calibrate the moving scale is described in details as follows.

First, after turning on the power of the auto focusing lens module 100, the lens holder 130 moves along the axial direction A1 so as to bring the first obstacle 132 to the space between the light-emitting surface S1 and the light-sensing surface S2 for defining a home position. In the embodiment, the method for judging the home position is usually to judge whether or not the voltage value sensed by the photo interrupter 120 is different from a predetermined voltage. When, for example, the voltage value sensed by the photo interrupter 120 is less or greater than the predetermined voltage, it may be defined that the lens holder 130 has moved to the home position. Taking that as an example the voltage value sensed by the photo interrupter 120 is less than the predetermined voltage, since while the first obstacle 132 is gradually approaching towards between the light-emitting surface S1 and the light-sensing surface S2 and interrupting the light-emitting surface S1, the light intensity received by the light-sensing surface S2 would be gradually reduced. That is to say, the voltage value (or photovoltaic) sensed by the photo interrupter 120 is gradually reduced. At the time, by using the predetermined voltage defined by the user, the event for the lens holder 130 to have moved to the home position designed by the user may be defined.

Next, after the lens holder 130 moves and arrives at the home position, the user can use a counter 170 to count the moving distance along the axial direction A1 of the lens holder 130 from the counting or the home position up so as to smoothly move the lens holder 130 onto an appreciate focusing position. Thereby, the auto focusing lens module 100 can perform focusing at the object side, in which the counter 170 may be a program able to record the number of the pulses emitted from a hardware to the step motor, as shown by FIG. 1. In the embodiment, a transmission device 150 is used to drive the lens holder 130 moving along the axial direction A1, in which the transmission device 150 is fixedly disposed on the casing 110 and is connected to the lens holder 130 through at least a transmission part 160. In this way, the transmission device 150 is able to drive the lens holder 130 moving along the axial direction A1. In the embodiment, the transmission device 150 is, for example, a step motor and the transmission part 160 is, for example, a plurality of gears 162 meshed with each other, as shown by FIGS. 1 and 3.

In more details, when the lens holder 130 located at the home position is to be moved to an appropriate focusing position, the counter 170 would firstly calculate out a moving value, and the transmission device 150 would drive the lens holder 130 located at the home position moving to the correct focusing position according to the moving value. For example, when the lens holder 130 located at the home position is to be moved to a first focusing position for focusing, the counter 170 would calculate out a first moving value, for example, a value of 300. After that, the transmission device 150 would drive the lens holder 130 located at the home position moving onto the first focusing position according to the first moving value. In the embodiment, the moving value counted by the counter 170 is substantially a moving/rotating graduation of the transmission device 150. That is to say, the moving value counted by the counter 170 may be transferred into the real physical amount corresponding to per unit moving value of the lens holder 130 along the axial direction A1. For example, the moving value of one can represent 0.01 mm moving of the lens holder 130.

However, along with the smaller and smaller volume of a lens module 100 today, due to the moving tolerances of the transmission part 160 and the transmission device 150 or due to various sources causing the transmission part 160 and the transmission device 150 degraded and wornout after repetitious usage, the transferring relationship between the moving value and the moving real physical amount of the lens holder 130 along the axial direction A1 corresponding to per unit value would be affected. For example, the original moving value of one represents 0.01 mm moving of the lens holder 130, but due to the above-mentioned reasons, the affected moving value of one may represent 0.012 mm or 0.008 mm moving of the lens holder 130. In other words, there is an error of the transferring relationship between the moving value counted by the counter 170 and the real moving physical amount corresponding to per unit value. As a result, the transmission device 150 is unable to precisely move the lens holder 130 onto the first focusing position and out-of-focus is produced, which causes bad imaging quality of the lens module 100.

To solve the above-mentioned problem, in the lens module 100, when the first obstacle 132 moves to the space between the light-emitting surface S1 and the light-sensing surface S2 and after the event is defined that the lens holder 130 is located at the home position, the lens holder 130 continuously moves to bring the calibrating interval 136 and the second obstacle 134 sequentially moving towards the space between the light-emitting surface S1 and the light-sensing surface S2, in which when the second obstacle 134 is brought to the space between the light-emitting surface S1 and the light-sensing surface S2, the above-mentioned counter 170 is used to count the calibrating interval 136 to obtain a counting value. In more details, while the calibrating interval 136 is passing through the space between the light-emitting surface S1 and the light-sensing surface S2, since the space between the light-emitting surface S1 and the light-sensing surface S2 is not yet obstacle by the obstacles of the lens holder 130, so that the voltage value sensed by the photo interrupter 120 would be greater than the predetermined voltage value. In other words, after the first obstacle 132 is brought to the space between the light-emitting surface S1 and the light-sensing surface S2 but prior to that the second obstacle 134 is brought to the space between the light-emitting surface S1 and the light-sensing surface S2, the above-mentioned counter 170 is used to count the calibrating interval 136 to obtain the above-mentioned counting value. Then, the real physical amount of the calibrating interval 136 is divided by the counting value to obtain a new moving value.

For example, if the real physical amount of the given calibrating interval 136 is 2 mm and the corresponding counting value counted by the counter 170 is 200, then, a counting value of one represents the transferred moving physical amount corresponding to per unit value is 0.01 mm. In this way, even the moving physical amount corresponding to per unit value obtained by transferring of the counting value is changed due to the above-mentioned reasons, the moving physical amount corresponding to per unit value obtained by transferring of the counting value may be momentarily corrected to the most correct value through the above-mentioned correction mechanism. For example, if the counting value of the calibrating interval 136 counted by the counter 170, due to the above-mentioned reasons, is 190, then, a counting value of one represents the transferred moving physical amount corresponding to per unit value is 2 mm÷190≈0.0105 mm. In this way, since the physical amount corresponding to per unit value is changed, which correspondingly alters the focusing counting value thereafter to ensure the lens holder 130 can move to the correct focusing position.

It should be noted that in the embodiment, the photo interrupter 120 is disposed on the substantially middle position P101 of the moving range of the lens holder 130 in the containing space 112 as shown in FIG. 1, which the invention is not limited to. In other embodiments, the photo interrupter 120 is mainly used to allow the first obstacle 132, the calibrating interval 136 and the second obstacle 134 sequentially pass through the space between the light-emitting surface S1 and the light-sensing surface S2, therefore, the position where the photo interrupter 120 is fixed onto the casing 110 is required not on the edge of the moving range of the lens holder 130. If so, the designed position where the photo interrupter 120 is fixed onto the casing 110 would fall in the claim scope of the invention.

Based on the depiction above, the auto focusing lens module 100 of the embodiment can correct the present moving physical amount of the lens holder 130 corresponding to per unit value through momentarily counting the counting value of the calibrating interval 136 and dividing the real moving physical amount corresponding to the given calibrating interval 136 by the counted counting value, which can make the auto focusing lens module 100 under long term usage or gradually miniaturizing the whole dimension thereof have better image focusing capability.

Figure 4:
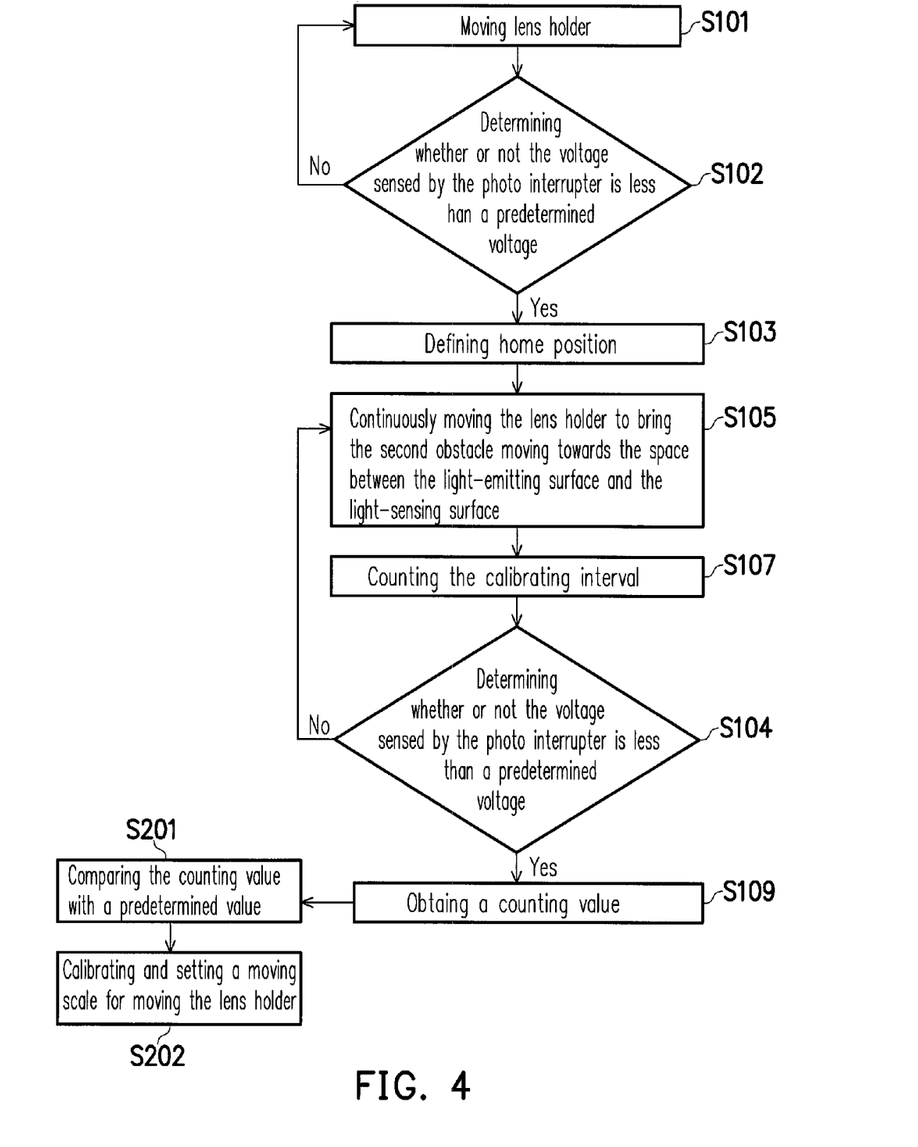
FIG. 4 is a schematic flow chart showing calibrating the moving scale of an auto focusing lens module according to an embodiment of the invention.

According to the depiction above, the invention provides a method for calibrating the moving scale of the auto focusing lens module 100, as shown by FIG. 4. FIG. 4 is a schematic flow chart showing calibrating the moving scale of an auto focusing lens module according to an embodiment of the invention. Referring to FIGS. 1 and 4, the method for calibrating the moving scale of the embodiment at least includes following steps. First, the above-mentioned lens holder 130 is moved, in which when the first obstacle 132 is brought to the space between the light-emitting surface S1 and the light-sensing surface S2 and the voltage (photovoltaic) sensed by the photo interrupter 120 is less than the predetermined voltage, the above-mentioned home position may be judged and defined, as shown by steps S101, S102 and S103 in FIG. 4.

Next, after the first obstacle 132 is moved to the space between the light-emitting surface S1 and the light-sensing surface S2, the lens holder 130 continuously moves so that the calibrating interval 136 and the second obstacle 134 sequentially pass through the space between the light-emitting surface S1 and the light-sensing surface S2, in which when the second obstacle 134 is brought to the space between the light-emitting surface S1 and the light-sensing surface S2 and the voltage (photovoltaic) sensed by the photo interrupter 120 is less than the predetermined voltage, the calibrating interval 136 has been counted to obtain the above-mentioned counting value, as shown by steps S105, S107, S104 and S109 in FIG. 4. In addition, while the calibrating interval 136 is moving between the light-emitting surface S1 and the light-sensing surface S2, since there is no obstacle between the light-emitting surface S1 and the light-sensing surface S2, so that the voltage (photovoltaic) sensed by the photo interrupter 120 would be greater than the predetermined voltage.

Then, the counting value is compared with the above-mentioned predetermined value so as to calibrate and set a moving scale for moving the lens holder, as shown by steps S201 and S202 in FIG. 4. To specific, since the counting value is the counted distance of the calibrating interval 136, in which the real physical distance of the calibrating interval 136 is given, so that the real physical distance for moving the lens holder 130 corresponding to per unit value may be more precisely obtained through dividing the distance of the calibrating interval 136 by the counting value. In other words, the method of the embodiment can simultaneously correct the moving scale for moving the lens holder 130 by comparing the counting value with the original predetermined value so as to have a better focusing capability.

It should be noted that in the embodiment, the time point to define the above-mentioned home position and to count the calibrating interval is, for example, in response to that the voltage (photovoltaic) sensed by the photo interrupter 120 is less than the predetermined voltage. In other embodiments however, the time point to define the above-mentioned home position and to count the calibrating interval is, for example, in response to that the voltage (photovoltaic) sensed by the photo interrupter 120 is greater than the above-mentioned predetermined voltage as well. As the depiction above, the judgment criteria to conduct the above-mentioned operations depends on the user requirement and the design and the situation of FIG. 4 is an exemplary case, which the invention is not limited to.

Figure 5:
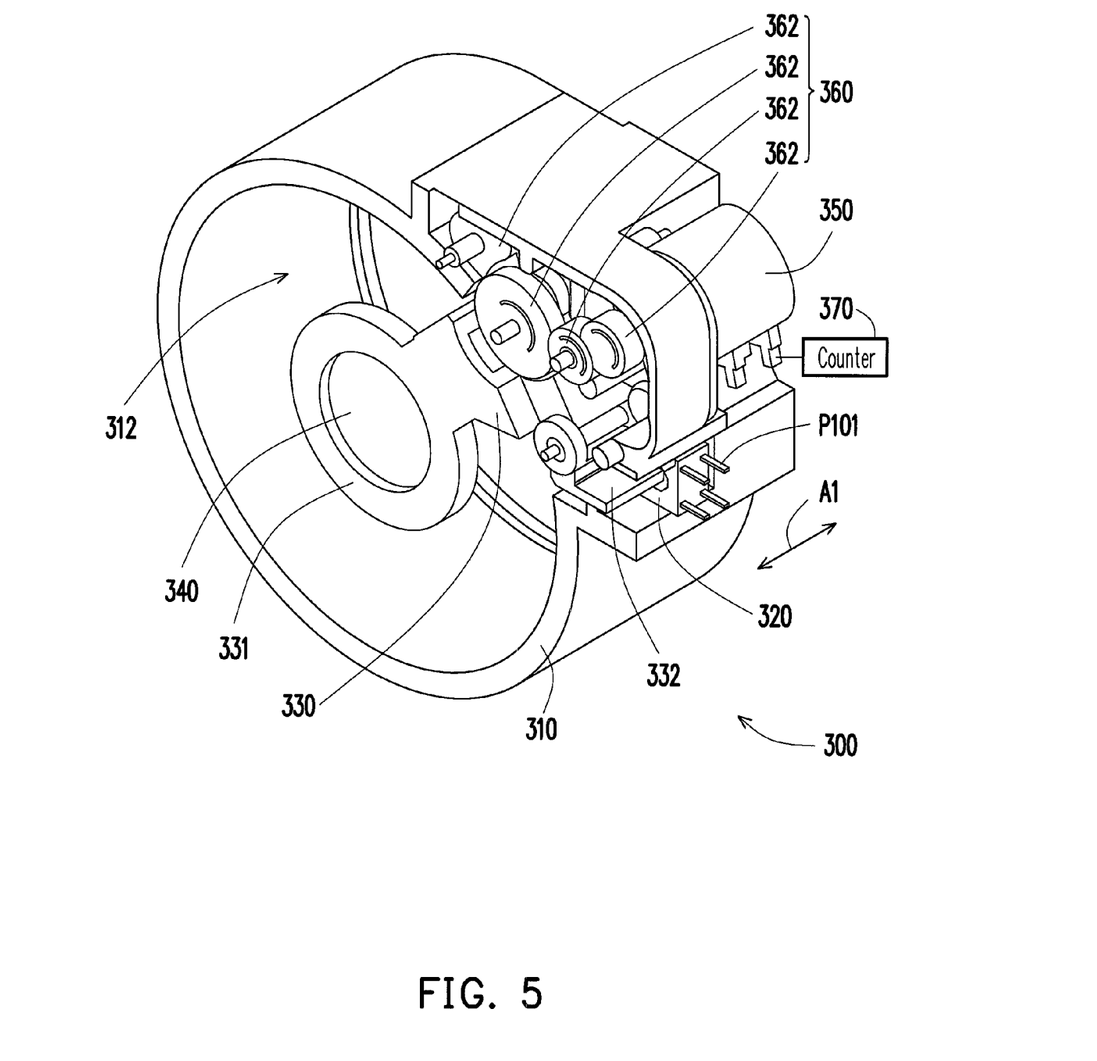
FIG. 5 is a localized diagram of an auto focusing lens module according to another embodiment of the invention.
Figure 6:
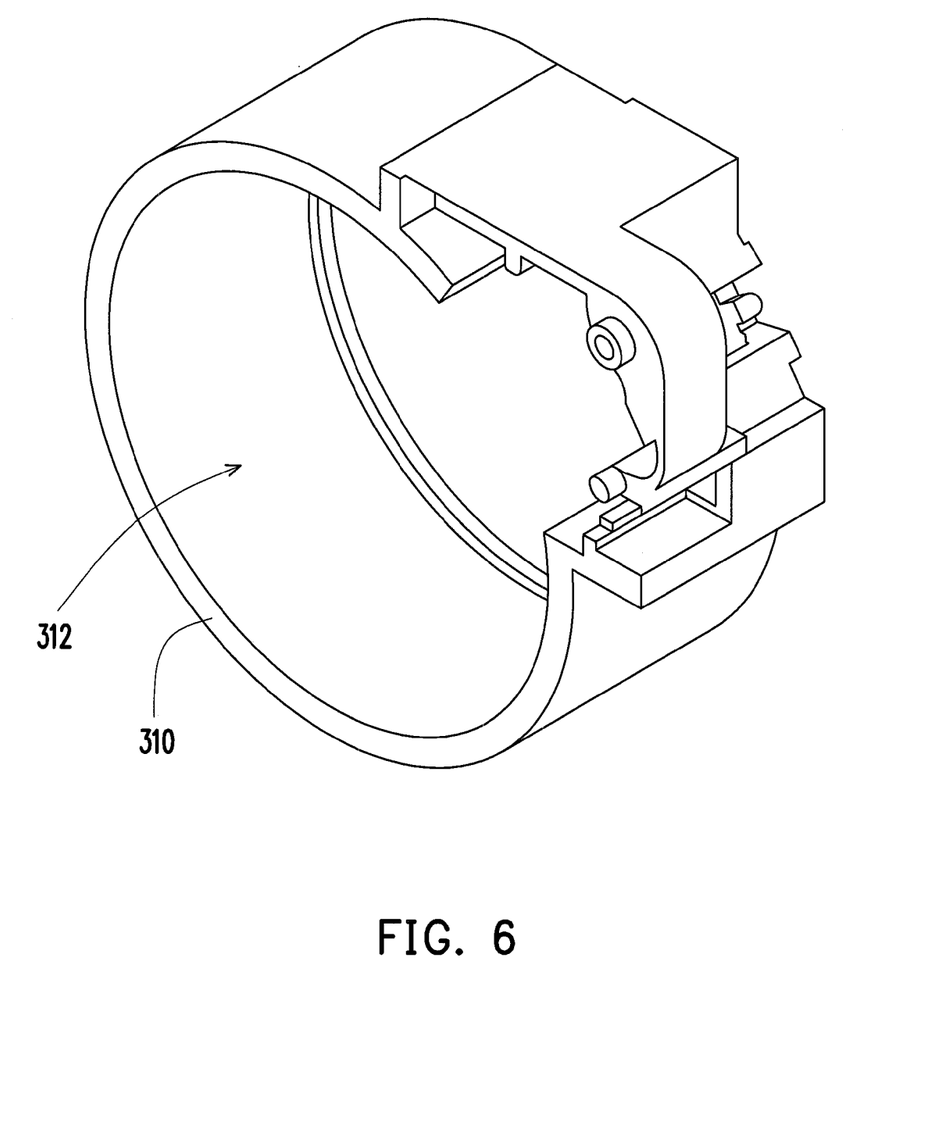
FIG. 6 is a diagram of the casing in FIG. 5.
Figure 7:
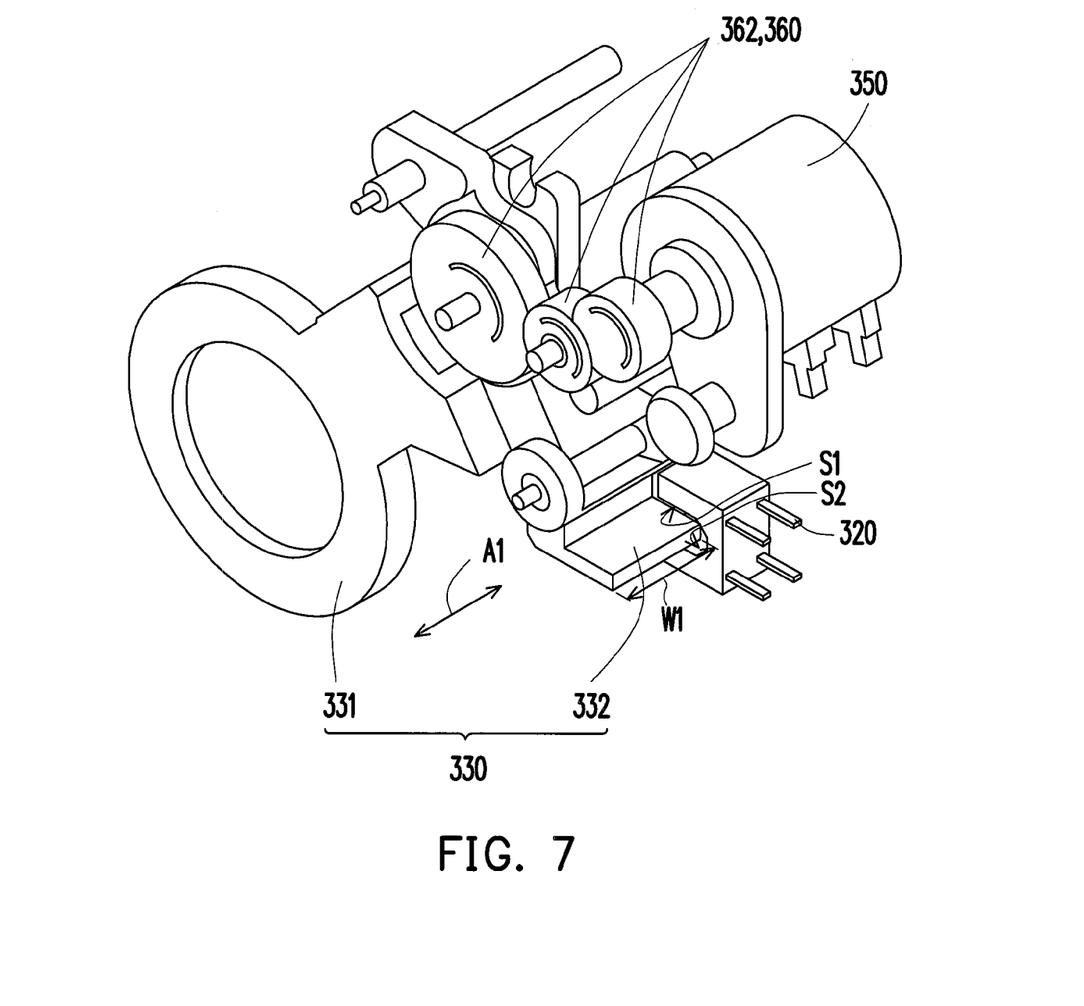
FIG. 7 is a diagram showing the photo interrupter, the lens holder and the transmission device in FIG. 5.

FIG. 5 is a localized diagram of an auto focusing lens module according to another embodiment of the invention, FIG. 6 is a diagram of the casing in FIG. 5 and FIG. 7 is a diagram showing the photo interrupter, the lens holder and the transmission device in FIG. 5. Referring to FIGS. 1-6, the auto focusing lens module 300 of the embodiment adopts the similar concept and principle to that of the above-mentioned auto focusing lens module 100 except that the lens holder 330 in the auto focusing lens module 300 of the embodiment has a calibrating obstacle 332, and a calibrating width W of the calibrating obstacle 332 is substantially greater than or equal to 2 mm. Similarly, the lens holder 330 is capable of moving to-and-fro along an axial direction to bring the calibrating obstacle 332 to-and-fro passing through the space between the light-emitting surface S1 and the light-sensing surface S2 of the photo interrupter 320.

In the embodiment, while the calibrating obstacle 332 is gradually approaching towards between the light-emitting surface S1 and the light-sensing surface S2 and interrupting the light-emitting surface S1, the light intensity received by the light-sensing surface S2 would be gradually reduced. That is to say, the voltage value (or photovoltaic) sensed by the photo interrupter 120 is gradually reduced. At the time, by using the predetermined voltage defined by the user, the event for the lens holder 330 to have moved to the home position designed by the user may be defined. Then, after the lens holder 330 continuously moves and departs from the home position, the user can use a counter 370 to count the moving distance along the axial direction A1 of the lens holder 330 from the home position up so as to smoothly move the lens holder 330 onto an appreciate focusing position. Thereby, the auto focusing lens module 300 can perform focusing at the object side.

In more details, while the calibrating obstacle 332 is passing through the space between the light-emitting surface S1 and the light-sensing surface S2, since the space between the light-emitting surface S1 and the light-sensing surface S2 is interrupted by the calibrating obstacle 332 of the lens holder 330, so that the voltage value sensed by the photo interrupter 320 would be durably less that the predetermined voltage value. In other words, after the voltage value sensed by the photo interrupter 320 begins to be less than the predetermined voltage value but before the voltage value sensed by the photo interrupter 320 begins to be greater that the predetermined voltage value, the above-mentioned counter 370 is used to count the calibrating obstacle 332 so as to obtain the above-mentioned counting value. After that, the real physical amount of the calibrating obstacle 332 is divided by the counting value to obtain a new moving value.

Based on the depiction above, the auto focusing lens module 300 of the embodiment can momentarily count the counting value of the calibrating obstacle 332 and makes the given real physical amount of the calibrating obstacle 332 divided by the counted counting value so as to correct the present moving physical amount of the lens holder 330 corresponding to per unit value, which can make the auto focusing lens module 300 under long term usage or gradually miniaturizing the whole dimension thereof have better image focusing capability.

In summary, the auto focusing lens module and the calibrating method thereof of the invention has following features. First, the auto focusing lens module can momentarily count the counting value of the calibrating interval and makes the real physical amount of the given calibrating interval divided by the counted counting value so as to correct the present moving physical amount of the lens holder corresponding to per unit value, which can make the auto focusing lens module under long term usage or gradually miniaturizing the whole dimension thereof have better image focusing capability. In addition, the auto focusing lens module can also momentarily count the counting value of the calibrating obstacle and makes the given real physical width amount of the calibrating obstacle divided by the counted counting value so as to reach the above-mentioned advantage. The invention also provides a calibrating method suitable for the above-mentioned lens module to advance the focusing capability of the lens module.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An auto focusing lens module, comprising:
   a casing, having a containing space;
   a photo interrupter, fixedly disposed on the casing and having a light-emitting surface and a light-sensing surface opposite to the light-emitting surface; and
   a lens holder, disposed in the containing space and having a first obstacle and a second obstacle, wherein the space between the first obstacle and the second obstacle keeps a calibrating interval, and the lens holder is capable of moving to-and-fro along an axial direction to drive the first obstacle, the calibrating interval or the second obstacle moving to the space between the light-emitting surface and the light-sensing surface.

2. The auto focusing lens module as claimed in claim 1, wherein the photo interrupter is located on the substantially middle position of a moving range of the lens holder in the containing space.

3. The auto focusing lens module as claimed in claim 1, further comprising a transmission device fixedly disposed on the casing and connecting the lens holder through at least a transmission part so as to drive the lens holder moving along the axial direction.

4. The auto focusing lens module as claimed in claim 3, further comprising a counter capable of counting the moving distance of the lens holder along the axial direction.

5. A calibrating method, suitable for an auto focusing lens module, the auto focusing lens module comprising a casing, a photo interrupter and a lens holder, the photo interrupter being fixedly disposed on the casing and having a light-emitting surface and a light-sensing surface opposite to the light-emitting surface, the lens holder being disposed in the containing space and having a first obstacle and a second obstacle, the space between the first obstacle and the second obstacle keeping a calibrating interval; the calibrating method comprising:

moving the lens holder, and defining a home position when the first obstacle is moved to the space between the light-emitting surface and the light-sensing surface;

keeping moving the lens holder so that the calibrating interval and the second obstacle sequentially pass through the space between the light-emitting surface and the light-sensing surface, and counting the calibrating interval to obtain a counting value when the second obstacle is moved to the space between the light-emitting surface and the light-sensing surface; and comparing the counting value with a predetermined value so as to calibrate and set a moving scale for moving the lens holder.

6. The calibrating method as claimed in claim 5, wherein when the first obstacle is moved to the space between the light-emitting surface and the light-sensing surface and a voltage sensed by the photo interrupter is less or greater than a predetermined voltage, the home position is defined.

7. The calibrating method as claimed in claim 5, wherein when the calibrating interval is moving between the light-emitting surface and the light-sensing surface, a voltage sensed by the photo interrupter is greater or less than a predetermined voltage.

8. The calibrating method as claimed in claim 5, wherein when the second obstacle is moved to the space between the light-emitting surface and the light-sensing surface and a voltage sensed by the photo interrupter is less or greater than a predetermined voltage, the calibrating interval has been counted so as to obtain the counting value.

9. The calibrating method as claimed in claim 5, wherein the method of moving the lens holder comprises:

using a transmission device to drive the lens holder moving along an axial direction.

10. The calibrating method as claimed in claim 5, wherein the method of counting the calibrating interval comprises:

using a counter to count the counting value of the calibrating interval.

11. An auto focusing lens module, comprising:

a casing, having a containing space;

a photo interrupter, fixedly disposed on the casing and having a light-emitting surface and a light-sensing surface opposite to the light-emitting surface; and a lens holder, disposed in the containing space, wherein the photo interrupter is located on the substantially middle position of a moving range of the lens holder in the containing space and the lens holder has a calibrating obstacle and a calibrating width of the calibrating obstacle is substantially greater than or equal to 2 mm, wherein the lens holder is capable of moving to-and-fro along an axial direction to bring the calibrating obstacle to-and-fro passing through the space between the light-emitting surface and the light-sensing surface.

12. The auto focusing lens module as claimed in claim 11, further comprising a counter capable of correspondingly generating a counting value while the calibrating obstacle is passing through the space between the light-emitting surface and the light-sensing surface.

13. The auto focusing lens module as claimed in claim 12, wherein the calibrating width is corresponding to the counting value.

14. The auto focusing lens module as claimed in claim 11, further comprising a transmission device fixedly disposed on the casing and connecting the lens holder through at least a transmission part so as to drive the lens holder moving along the axial direction.

\* \* \* \* \*